United States Patent
Agashe et al.

(10) Patent No.: US 9,840,661 B2
(45) Date of Patent: Dec. 12, 2017

(54) BIOPOLYMER BASED CATIONIC SURFACTANT FOR CLAY STABILIZATION AND PREVENTION OF SLUDGING

(71) Applicant: Halliburton Energy Services, Inc., Houston, TX (US)

(72) Inventors: Snehalata Sachin Agashe, Pune (IN); Ravikant S. Belakshe, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/114,964

(22) PCT Filed: Aug. 14, 2015

(86) PCT No.: PCT/US2015/045326
§ 371 (c)(1),
(2) Date: Jul. 28, 2016

(87) PCT Pub. No.: WO2017/030537
PCT Pub. Date: Feb. 23, 2017

(65) Prior Publication Data
US 2017/0233643 A1   Aug. 17, 2017

(51) Int. Cl.
| | | |
|---|---|---|
| C09K 8/08 | (2006.01) | |
| C09K 8/035 | (2006.01) | |
| C09K 8/72 | (2006.01) | |
| C09K 8/60 | (2006.01) | |
| C09K 8/575 | (2006.01) | |
| C09K 8/524 | (2006.01) | |
| C09K 8/68 | (2006.01) | |

(52) U.S. Cl.
CPC .............. *C09K 8/725* (2013.01); *C09K 8/035* (2013.01); *C09K 8/08* (2013.01); *C09K 8/524* (2013.01); *C09K 8/5758* (2013.01); *C09K 8/608* (2013.01); *C09K 8/68* (2013.01); *C09K 2208/12* (2013.01)

(58) Field of Classification Search
None
See application file for complete search history.

(56) References Cited

U.S. PATENT DOCUMENTS

| | | |
|---|---|---|
| 3,083,158 A | 3/1963 | Markham |
| 4,442,014 A | 4/1984 | Looney et al. |
| 5,152,906 A | 10/1992 | Aften et al. |
| 5,342,530 A | 8/1994 | Aften et al. |
| 5,350,740 A | 9/1994 | Patel et al. |
| 5,622,921 A | 4/1997 | Dyer |
| 6,972,274 B1 * | 12/2005 | Slikta ................. C09K 8/52 166/270 |
| 8,481,480 B1 | 7/2013 | Lam et al. |
| 2004/0045712 A1 | 3/2004 | Eoff et al. |
| 2009/0029880 A1 | 1/2009 | Berry et al. |
| 2011/0256085 A1 | 10/2011 | Talingting Pabalan et al. |
| 2013/0048281 A1 | 2/2013 | Van Zanten et al. |
| 2014/0262280 A1 | 9/2014 | Hill |

FOREIGN PATENT DOCUMENTS

| | | |
|---|---|---|
| CA | 2385605 A1 | 4/2001 |
| CA | 2575012 C | 3/2006 |
| WO | WO2014014886 A1 | 1/2004 |
| WO | WO 2014/074443 A1 | 5/2014 |
| WO | WO2016126259 A1 | 8/2016 |

OTHER PUBLICATIONS

International Search Report and Written Opinion for PCT/US2015/045326 prepared by ISA/KR on Apr. 29, 2016 (9 pages).
Hart, Kevin Michael, "Capillary Suction Time Tests on Selected Clays and Shales," Master's Thesis, No. AD-A-217445/6/XAB; AFIT/CL/CIA-89-097. Air Force Inst. of Tech., Wright-Patterson AFB, OH (USA), 1989.
Mirvakili et al., "Effect of a Cationic Surfactant as a Chemical Destabilization of Crude Oil Based Emulsions and Asphaltene Stabilized," Journal of Chemical and Engineering Data, 2012, 1689-1699, 57.6, Shiraz, Iran.

* cited by examiner

*Primary Examiner* — John J Figueroa
(74) *Attorney, Agent, or Firm* — Haynes and Boone, LLP

(57) ABSTRACT

Methods of stabilizing swellable clays in a subterranean formation and methods of reducing the formation of sludge in a subterranean formation using a biopolymer based cationic surfactant are described. The biopolymer based cationic surfactant includes a quaternary ammonium compound having an alkyl polyglucoside backbone and amino alcohol side chains.

20 Claims, No Drawings

BIOPOLYMER BASED CATIONIC SURFACTANT FOR CLAY STABILIZATION AND PREVENTION OF SLUDGING

BACKGROUND

The present invention relates generally to methods of stabilizing a subterranean formation. In particular, the present invention relates to methods of stabilizing swellable clays in the formation and methods of reducing the formation of sludge in the formation using a biopolymer based cationic surfactant.

The recovery of fluids such as oil and gas from subterranean formations has been troublesome in formations that contain water sensitive minerals, e.g., water-swellable clays such as clays in the smectite group and fines capable of migrating when disturbed such as silica, iron minerals and alkaline earth metal carbonates. Clay minerals ubiquitous in sedimentary rocks are hydrous aluminum phyllosilicates characterized by a stack of two-dimensional sheets composed of the $SiO_4$ tetrahedron and/or the $AlO_4$ octahedron. They can cause major problems during hydrocarbon exploration as clay minerals have a tendency to swell/migrate in the presence of water. The water can come from injection fluids, drilling muds, stimulation fluids, and gels. The ion-exchangeable cations present in-between the aluminosilicate sheets attract water in the interlayer molecular spaces and cause swelling. For example, the smectite group of clays such as montmorillonite absorbs water and expands in volume. During oil exploration, introduction of water causes these clays to swell, ultimately degrading the porosity and reducing the formation permeability. The clay mineral kaolinite, on the other hand, generates fines in the presence of water and tends to migrate. These fines migrate through the formation, blocking the pore spaces and reducing the permeability of the formation.

This loss in permeability and plugging or impairing the flow of formation fluids toward the well bore results in either a loss of the formation fluids or a decrease in the rate of recovery from the well. Sometimes the migrating fines are produced with the formation fluids and present abrasion and other problems with the above-ground equipment.

In an effort to overcome these problems, various methods have been developed for treating subterranean formations to stabilize swelling clays and migratable fines. For example, it has been a common practice to add salts to aqueous drilling fluids. The salts adsorb to clay surfaces in a cation exchange process and can effectively reduce the swelling and/or migration of the clays. Various polymers and consolidating resins have also been used. However, in many areas, environmental regulations restrict the use of high salt concentrations and various resin and polymer compositions.

Various acids are used to stimulate subterranean hydrocarbon-bearing formations. The acid functions to dissolve acid soluble materials in the formation so as to increase the permeability of the formation. The permeability increase is effected by cleaning or enlarging flow channels leading to the well bore allowing more oil or gas to flow to the well bore.

Another problem is encountered when acid is introduced into the formation. Hydrochloric acid (HCl), particularly when at high concentrations of about 15% and greater, can cause the development of sludge when the acid is placed in contact with certain types of crude oil. The sludge formation problem is exacerbated when the acid that is in contact with the crude oil also contains ferric ion.

Certain crude oils contained in subterranean formations produce sludge upon contact with aqueous acid solutions during the carrying out of acidizing treatments. The sludge formed is an asphalt-like material which precipitates in the formations and often plugs or clogs the enlarged flow channels formed therein. Interaction studies between sludging crude oils and acids have shown that precipitated solids or films are formed at the acid oil interface. The precipitates are mainly asphaltenes, resins, paraffins and other high-molecular weight hydrocarbons.

When sludges are produced in crude oil, the viscosity of the oil drastically increases. Due to this increase, the rheological characteristics of the fluid can exhibit negative effects by a dramatic decrease in formation fluid-drainage properties. The treated formations are very slow to clean up, if at all, and often the acidizing treatments produce a decrease in permeability and reduction in oil production instead of an increase.

Methods for preventing or reducing sludge formation include the addition of alkyl phenols, fatty acids, surfactants and the like to stabilize the acid-oil emulsion against sludge formation. The various materials suffer from various problems during use. The anti-sludge agents may be incompatible with other additives such as corrosion inhibitors used in the acid, suffer from poor dispersibility in acids or brines, or be corrosive to metals and the like.

Thus, there is a continuing need for improved methods and compositions for treating subterranean formations. Specifically, there is a need for improved methods and compositions for preventing the swelling of clays and reducing the formation of sludge in oil and gas operations.

DETAILED DESCRIPTION

According to several exemplary embodiments, methods are provided for treating subterranean formations using a biopolymer based cationic surfactant. Such treatment operations can include, for example, drilling operations, stimulation operations, production operations, remediation operations, sand control treatments, and the like. As used herein, "treat," "treatment," and "treating" refer to any subterranean operation that uses a fluid in conjunction with achieving a desired function and/or for a desired purpose. More specific examples of treatment operations include drilling operations, fracturing operations, gravel packing operations, acidizing operations, scale dissolution and removal operations, sand control operations, consolidation operations, anti-sludge operations, and the like.

According to several exemplary embodiments, a method is provided for stabilizing swellable clays in a subterranean formation using a biopolymer based cationic surfactant. Swellable clays that can be stabilized by such exemplary methods of the present invention include, but are not limited to, the smectite group such as montmorillonite, beidellite, nontronite, saponite, hectorite and sauconite; the kaolin group such as kaolinite, nacrite, dickite, endellite and halloysite; the illite group such as hydrobiotite, glauconite and illite; the chlorite group such as chlorite, greenalite and chamosite; and other clay minerals not belonging to the above groups such as vermiculite, palygorskite, sepiolite; and mixed-layer (both regular and irregular) varieties of the above minerals. For example, smectite clay minerals which have a very high cation exchange capacity, tend to swell when contacted with fresh water, thereby reducing formation permeability. The swelling can also cause smectite to disperse into platelets which can then migrate and block passageways to the well bore. Contacting swellable clays with the biopolymer based cationic surfactant reduces the tendency of these clays to swell.

According to several exemplary embodiments, the clay-containing subterranean formation includes a shale. Shale is a fine-grained, clastic sedimentary rock composed of a mix of clay minerals and fragments of other minerals such as quartz, calcite, pyrite, chlorite, feldspar, opal, cristobalite, biotite, clinoptilite, gypsum, and the like. The ratio of clay to the other minerals may vary depending on the source of the shale. In an embodiment, the clay present in the shale can include a smectite, illite, mixed smectite-illite layer, chlorite, corrensite, kaolinite clay, and/or any combination thereof. As an example, a smectite clay may be sodium bentonite that may contain sodium in addition to the components magnesium, aluminum and silica. Additional species of smectite clay include hectorite, saponite, nontronite, beidellite, and/or sauconite.

According to several exemplary embodiments, a method is provided for reducing the formation of sludge in a subterranean formation using a biopolymer based cationic surfactant. The use of the biopolymer based cationic surfactant minimizes or prevents the precipitation of sludge, such as asphaltenes, maltenes, or similar asphaltic components, during an acidizing treatment. The biopolymer based cationic surfactant can be added to an aqueous acidic solution before injecting the solution into a well or formation for treatment.

According to several exemplary embodiments, a method is provided for stabilizing swellable clays and reducing formation of sludge in a subterranean formation using a biopolymer based cationic surfactant. The biopolymer based cationic surfactant advantageously can be used for multiple purposes and applications in treatment fluids.

According to several exemplary embodiments, the biopolymer based cationic surfactant includes a quaternary ammonium compound having an alkyl polyglucoside backbone and amino alcohol side chains. According to several exemplary embodiments, the biopolymer based cationic surfactant includes a compound having the Formula I:

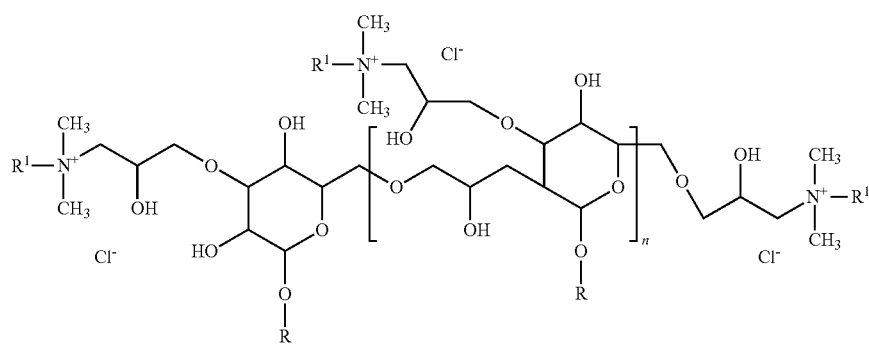

Formula I where R is a $C_1$-$C_{15}$ chain and $R^1$ is a $C_1$-$C_{39}$ chain. According to several exemplary embodiments, $R^1$ is a $C_6$-$C_{39}$ chain. According to several exemplary embodiments, the end group includes Propanammonium, N-cocoalkyl-N,N dimethyl 2,3 dihydroxy; Propanammonium, N-cocoalkyl-N,N diethyl, 2,3 dihydroxy; Propanammonium, N-cocoalkyl-N,N dipropyl 2,3 dihydroxy; Propanammonium, N-cocoalkyl-N-methyl, N-ethyl 2,3 dihydroxy; Propanammonium, N-cocoalkyl-N-methyl, N-propyl 2,3 dihydroxy; Propanammonium, N-cocoalkyl-N-ethyl, N-propyl 2,3 dihydroxy; Propanammonium, N-soyalkyl-N,N dimethyl, 2,3 dihydroxy; Propanammonium, N-soyalkyl-N,N diethyl, 2,3 dihydroxy; Propanammonium, N-soyalkyl-N,N dipropyl 2,3 dihydroxy; Propanammonium, N-soyalkyl-N-methyl,N-ethyl 2,3 dihydroxy; Propanammonium, N-soyalkyl-N-methyl,N-propyl 2,3 dihydroxy; Propanammonium, N-soyalkyl-N-ethyl, N-propyl 2,3 dihydroxy; Ethanammonium, N-cocoalkyl-N,N diethyl 2 hydroxy; Ethanammonium, N-cocoalkyl-N,N dimethyl 2 hydroxy; Ethanammonium, N-cocoalkyl-N-methyl, N-ethyl 2 hydroxy; Ethanammonium, N-cocoalkyl-N-methyl, N-propyl 2 hydroxy; Ethanammonium, N-cocoalkyl-N-ethyl, N-propyl 2 hydroxy; Ethanammonium, N-soyalkyl-N,N diethyl 2 hydroxy; Ethanammonium, N-soyalkyl-N,N dimethyl 2 hydroxy; Ethanammonium, N-soyalkyl-N-methyl, N-ethyl 2 hydroxy; Ethanammonium, N-soyalkyl-N-methyl, N-propyl 2 hydroxy; Ethanammonium, N-soyalkyl-N-ethyl, N-propyl 2 hydroxy, and the like.

In several exemplary embodiments, the biopolymer based cationic surfactant includes polyquaternium-81, which is a compound having the Formula I where R is a lauryl group having a $C_{12}$ chain and $R_1$ is a stearyl group having a $C_{18}$ chain. Polyquaternium-81 is an environmentally acceptable biopolymer based cationic surfactant that can function as a corrosion inhibitor, clay stabilizer, and antisludging agent in oilfield applications. Polyquaternium-81 is the complex polymer formed by crosslinking lauryl glucoside with 1,3-dichloro-2-propanol, followed by quaternization of the residual chloropropanol groups with stearyldimethylamine. Polyquaternium-81 is a surfactant used in personal care materials, such as cosmetics, and is a derivative of polysaccharide. Polyquaternium-81 is non-hazardous.

Advantageously, the biopolymer based cationic surfactant, on its own, can be used to treat subterranean formations in a variety of ways. Traditionally, a combination of chemicals would be needed. The biopolymer based cationic surfactant can be used to stabilize clays and shales, reduce sludging problems in crude oil, and inhibit corrosion. Because the biopolymer based surfactant is a surfactant, it can also be used as an emulsifier or de-emulsifier.

According to several exemplary embodiments, methods of treating a subterranean formation include providing a treatment fluid containing a biopolymer based cationic surfactant, wherein the biopolymer based cationic surfactant includes polyquaternium-81, and introducing the treatment fluid into the subterranean formation.

According to several exemplary embodiments, the treatment fluid further includes any number of additives that are commonly used in treatment fluids including, for example, other surfactants, anti-oxidants, polymer degradation prevention additives, relative permeability modifiers, foaming agents, defoaming agents, antifoaming agents, emulsifying agents, de-emulsifying agents, proppants or other particulates, salts, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, and the like. Combinations of these additives can be used as well.

According to several exemplary embodiments, the treatment fluid includes an aqueous fluid. Suitable aqueous fluids may include, for example, fresh water, salt water, seawater, brine (e.g., a saturated salt solution), or an aqueous salt solution (e.g., a non-saturated salt solution). Aqueous fluids can be obtained from any suitable source.

Clay Stabilization

Without being bound by theory, it is believed that the biopolymer based cationic surfactant adsorbs to the surface of the clays and fines to prevent their swelling and migration. This adsorption relates to the ability of the biopolymer based cationic surfactant to irreversibly bind to the clay surface and make the surface hydrophobic. The surfactant inhibits clay swelling and disintegration or exfoliation of the clay by exchanging the cations in the clay layers with the cations in the surfactants. This cation exchange makes the surface hydrophobic and results in non-swelling and integration of the clay layers. When the biopolymer based cationic surfactant is adsorbed on the clay surface, the long chain alkyl polyglucoside in its molecule forms a hydrophobic film on the clay surface to prevent further penetration of the water to decrease the clay hydratability. The cations in the surfactant can also neutralize the negative charges on the clay surface to reduce repulsion between the clay layers.

The biopolymer based cationic surfactant can exchange cations irreversibly because of its greater affinity to the clay layers compared to traditionally used simple inorganic cations. The capacity to bind the clay layers, keep them intact, and exchange cations irreversibly is relatively higher when the molecule has more than one cationic group. The ability to bind the clay layers is further enhanced when there are multiple cationic ammonium groups present in the molecule. Accordingly, the biopolymer based cationic surfactant described herein acts as a better clay control agent than many existing clay inhibitors. In addition, the biopolymer based cationic surfactant is environmentally safe and non-hazardous.

According to several exemplary embodiments, a method for stabilizing swellable clays in a subterranean formation includes providing a treatment fluid containing a biopolymer based cationic surfactant and introducing the treatment fluid into the subterranean formation. The treatment fluid is prepared by combining and mixing a known volume or weight of treatment fluid and the biopolymer based cationic surfactant using mixing procedures known to those of ordinary skill in the art. In some embodiments, the treatment fluid includes water and a biopolymer based cationic surfactant, wherein the biopolymer based cationic surfactant is present in the treatment fluid in an amount of from about 0.1 to about 5 weight percent. In several exemplary embodiments, the biopolymer based cationic surfactant is present in the treatment fluid in an amount of about 2 weight percent.

The water utilized in the treatment fluid can be fresh water, salt water, or a mixture thereof, depending on the density desired and the formation sensitivity.

Salt may be added to the treatment fluid. Suitable salts include, but are not limited to, sodium, ammonium, potassium, calcium and zinc chlorides, bromides, hydroxides, and acetates, as well as other salts commonly used and known to those of ordinary skill in the art.

The treatment fluid can also include aqueous acid solutions. Suitable aqueous acids include, but are not limited to, HCl, citric acid, acetic acid, formic acid, hydrofluoric acid, and mixtures thereof. The treatment fluid can include alcohol-water mixtures such as methanol and water as well as gelled fluids containing various polysaccharides and synthetic polymers. As will be understood by those of ordinary skill in the art, a variety of conventional additives can be added to the treatment fluid that does not adversely react with the biopolymer based cationic surfactant.

The treatment fluid can be made to contact the swellable clays by any suitable method that provides effective contact between the treatment fluid and the clays. The treatment fluid utilized can be used in conjuction with drilling, well injecting, gravel packing, fracturing or other operations performed on the subterranean formation. For example, the treatment fluid containing the surfactant can be used in conjunction with drilling or completion operations to alleviate the damage otherwise caused by drilling or completion fluids.

Reduction of Sludge

According to several exemplary embodiments, the method of reducing formation of sludge in a subterranean formation includes combining a biopolymer based cationic surfactant and an aqueous acid solution to form a treatment fluid, wherein the biopolymer based cationic surfactant includes polyquaternium-81, and introducing the treatment fluid into a subterranean formation. For example, the biopolymer based cationic surfactant can be added to an HCl solution to reduce the sludging tendencies caused by asphaltene precipitation.

Various kinds and concentrations of aqueous acid solutions can be utilized for carrying out the methods. Commonly used acids include HCl, organic acids, such as citric acid, formic acid, acetic acid, and gluconic acid, and mixtures of such acids. Aqueous solutions of the acids at concentrations of from about 5% to about 28%-30% by weight can be utilized. An about 15% by weight aqueous HCl solution is suitable for use in accordance with several exemplary embodiments of the present invention.

In several exemplary embodiments, the biopolymer based cationic surfactant is present in an amount of about 0.1 to about 5 weight percent of the treatment fluid.

According to several exemplary embodiments, the treatment fluids and methods are used in acidizing operations (e.g., fracture acidizing or matrix acidizing) of subterranean formations. A common practice to increase production from a crude oil or gas well involves an acid stimulation treatment of the well. Acid stimulation of a well involves the pumping downhole of an aqueous acid solution which reacts with the subterranean hydrocarbon containing formations, such formations usually consisting of limestone or sand, to increase the size of the pores within the formations and provide enlarged passageways for the crude hydrocarbons to more freely move to collection points which otherwise would be obstructed.

Unfortunately, during such acidizing operations, asphaltene sludges may form, which block the existing and newly formed passageways and reduce the efficacy of the acidizing treatment. The biopolymer based cationic surfactant in the treatment fluid can reduce these crude oil sludging tendencies.

Without being bound by theory, it is believed that the biopolymer based cationic surfactant stabilizes the asphaltenes in the crude oil by forming a protective layer around the asphaltene particles. This prevents aggregation of particles of asphaltene and the formation of sludge.

In several exemplary embodiments, the treatment fluid containing the biopolymer based cationic surfactant is used in acidizing treatments with other additives, such as iron control agents and reducers, such as citric acid, ethylenediaminetetraacetic acid, acetic acid, nitrilotriacetic acid, and sodium erythorbate, among others. The biopolymer based cationic surfactant is also compatible with most nonionic and anionic foamers, retarders and viscosifiers.

The most commonly used anti-sludging agents include anionic surfactants. However, the anionic nature of these surfactants brings about incompatibilities with commonly used cationic corrosion inhibitors and cationic de-emulsifiers. Cationic corrosion inhibitors are generally included in aqueous acid solutions utilized in wells penetrating subterranean zones having high temperatures, e.g., 250° F. and higher. However, a problem that has been encountered with the use of the high temperature performing cationic corrosion inhibitors is that the cationic ions in the corrosion inhibitors react with the anioinic surfactants in the anti-sludging agent resulting in precipitation and loss of acidizing performance. As a result, HCl stimulation procedures in wells containing sludging and emulsifying oils is limited to temperatures in which non-cationic corrosion inhibitors can be used, i.e., to temperatures less than about 250° F. to thereby avoid precipitation, etc. Another disadvantage is that when HCl cannot be used due to high temperatures, sludging, and emulsifying oils, less effective organic acids must be employed.

Advantageously, the biopolymer based cationic surfactant is cationic in nature and can be used successfully with almost all corrosion inhibitors and other cationic additives. Because the biopolymer based cationic surfactant is cationic, it does not react and precipitate with other cationic species in the treatment fluid.

The following examples are illustrative of the compositions and methods discussed above and are not intended to be limiting.

Example 1

Capillary Suction Time (CST) Test

The CST test measures the swelling tendency of formation materials in the presence of a treatment fluid. A slurry of formation materials and treatment fluid is generated, and the time required for the free liquid to travel a calibrated distance in a standard porous paper is measured. The measurement is made by placing a certain volume of slurry into a sample cylinder that is resting on a standard porous paper. Electrodes located at two different distances from the edge of the cylinder are connected with a timer. The timer starts when liquid reaches the closest electrode and then stops when it reaches the outer electrode. The time interval measured is sensitive to the amount of free water in the slurry and the permeability of the filter cake deposited. As the formation material swells, it takes up free water from the slurry, which decreases available water to wick through the filter paper. Therefore, the lower the capillary suction time, the less the formation materials swell in that treatment fluid.

CST tests were performed on deionized water, 0.1% Cla-Web$^{SM}$ stabilizing additive, and 0.1% polyquaternium-81. The results of the tests are provided below in Table I.

TABLE I

5% Smectite Clay (Aquagel Gold Seal ®) in SSA-1 ™ Sand

| Test No. | Recipe | Run 1 (Time in sec) | Run 2 (Time in sec) | Run 3 (Time in sec) | Average (Time in sec) |
| --- | --- | --- | --- | --- | --- |
| 1 | DI Water | 32.5 | 36.9 | 32.1 | 33.83 |
| 2 | 0.1% Cla-Web $^{SM}$ | 12 | 11.3 | 11.7 | 11.67 |
| 3 | 0.1% Polyquaternium-81 | 13.5 | 14.1 | 12.7 | 13.43 |

The deionized water took the longest at about 34 seconds due to swelling of the clay. The 0.1% ClaWeb$^{SM}$ stabilizing additive solution took about 12 seconds and the 0.1% polyquaternium-81 solution took about 14 seconds. The CST test results show that polyquaternium-81 stabilizes the clays by avoiding migration and swelling of the clay.

Example 2

Acid/Crude Oil Sludging Determination

Various test fluids were prepared and mixed with crude oil. Test fluid #1 was prepared by adding a ferric chloride (FeCl$_3$) solution and a 15% HCl solution to produce an HCl solution with 500 ppm iron. Test fluid #2 was prepared by adding a 15% HCl solution, FeCl$_3$ solution, and polyquaternium-81 to produce an HCl solution with 500 ppm iron and 2 gallons per thousand gallons (gpt) polyquaternium-81. Test fluid #3 was prepared by adding a 15% HCl solution, FeCl$_3$ solution, and polyquaternium-81 to produce an HCl solution with 500 ppm iron and 5 gpt polyquaternium-81. Each test fluid was then thoroughly mixed in a 4 oz shaker bottle. Once each test fluid was mixed, crude oil was added to the aqueous layer, and the cap securely replaced. With the cap in place, a typical acid/crude oil sludging determination was conducted at 160° F. (although the tests can be conducted at any temperature up to 400° F.). The test fluids were subsequently filtered to separate any solids that were suspended within the fluid. The amount of sludge formed was collected on filter paper. The qualitative protocol of the test was followed, as opposed to the quantitative.

In test fluid #1, a dense sludge was formed that solidified the entire blend. Test fluids #2 and #3 produced emulsions having minimal sludge. Test fluid #3 appeared to have more sludge than test fluid #2, but this was likely due to the higher concentration of polyquaternium-81, which may have precipitated out with the sludge.

Next, 25-30 mL of diesel was added to the sludge to see if the formed sludge was soluble. Because the sludge is an aggregate of asphaltenes, it was expected that the sludge would be soluble in diesel. When diesel was added to the sludges formed in the test fluids, some of the sludge dissolved, but most of the sludge remained. The formed sludges, however, appeared to be more dispersed and less aggregated after the diesel was added. The formed sludges were likely strong aggregates of iron with asphaltene or aggregates of excess polyquaternium-81 with asphaltene.

Finally, the bottles holding each test fluid were examined. The bottle that held test fluid #1 showed signs of sludge left on the bottle, with sludge covering almost all of the inside of the bottle. In contrast, test fluids #2 and #3 produced minimal remnants of sludge in the bottle, with little to no sludge covering the inside of the bottle. From these results, it can be seen that the test fluids containing polyquaternium-81 effectively prevented the formation of sludge. It can be concluded that addition of this polymer effectively reduced the amount of sludge formation in the reaction mixture. Therefore, polyquaternium-81 can be used as an antisludging agent during acid treatment of formations producing crude oils with high content of asphaltenes.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of stabilizing swellable clays in a subterranean formation comprising:

providing a treatment fluid comprising a biopolymer based cationic surfactant that includes a quaternary ammonium compound having an alkyl polyglucoside backbone and amino alcohol side chains; and introducing the treatment fluid into the subterranean formation.

2. The method of claim 1, wherein the biopolymer based cationic surfactant has the formula:

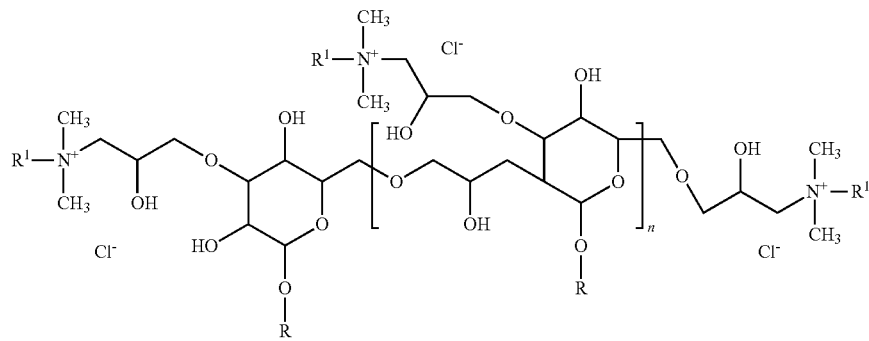

where R is a $C_1$-$C_{15}$ chain and $R^1$ is a $C_1$-$C_{39}$ chain.

3. The method of claim 2, wherein R is a $C_{12}$ chain and $R_1$ is a $C_{18}$ chain.

4. The method of claim 1, wherein the swellable clays are selected from the group consisting of smectite, kaolin, illite, chlorite, vermiculite, palygorskite, sepiolite and mixtures thereof.

5. The method of claim 1, wherein the treatment fluid further comprises water.

6. The method of claim 5, wherein the water comprises fresh water, salt water, or mixtures thereof.

7. The method of claim 5, wherein the treatment fluid comprises from about 0.1 to about 5 weight percent of the biopolymer based cationic surfactant.

8. The method of claim 1, wherein the treatment fluid further comprises an aqueous acid solution, alcohol-water mixture, gel, or mixtures thereof.

9. A method of reducing formation of sludge in a subterranean formation comprising:
combining a biopolymer based cationic surfactant and an aqueous acid solution to form a treatment fluid, wherein the biopolymer based cationic surfactant comprises a quaternary ammonium compound having an alkyl polyglucoside backbone and amino alcohol side chains;
introducing the treatment fluid into the subterranean formation; and
contacting a sludging crude oil with the treatment fluid.

10. The method of claim 9, wherein the biopolymer based cationic surfactant has the formula:

11. The method of claim 10, wherein R is a $C_{12}$ chain and $R_1$ is a $C_{18}$ chain.

12. The method of claim 9, wherein the aqueous acid solution comprises hydrochloric acid and/or hydrochloric-hydrofluoric acid mixtures.

13. The method of claim 12, wherein the aqueous acid solution comprises about 15 weight percent hydrochloric acid.

14. The method of claim 9, wherein the treatment fluid comprises from about 0.1 to about 5 weight percent of the biopolymer based cationic surfactant.

15. The method of claim 9, wherein reducing the formation of sludge is part of an acidizing operation.

16. The method of claim 9, wherein the sludging crude oil comprises asphaltenes.

17. A method of stabilizing swellable clays and reducing formation of sludge in a subterranean formation comprising:
providing a treatment fluid comprising a biopolymer based cationic surfactant that includes a quaternary ammonium compound having an alkyl polyglucoside backbone and amino alcohol side chains; and
introducing the treatment fluid into the subterranean formation.

18. The method of claim 17, wherein the biopolymer based cationic surfactant has the formula:

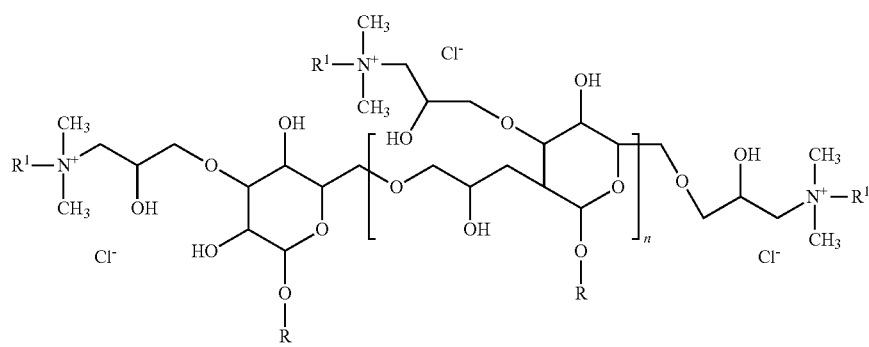

where R is a $C_1$-$C_{15}$ chain and $R^1$ is a $C_1$-$C_{39}$ chain.

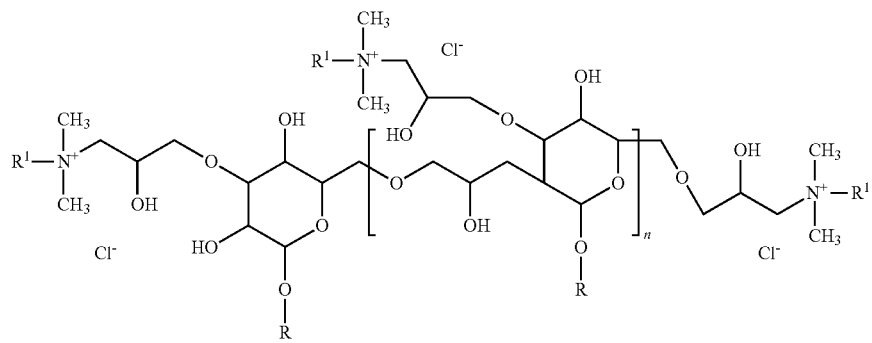
where R is a $C_1$-$C_{15}$ chain and $R^1$ is a $C_1$-$C_{39}$ chain.
19. The method of claim 18, wherein R is a $C_{12}$ chain and $R_1$ is a $C_{18}$ chain.
20. The method of claim 17, wherein the treatment fluid further comprises an aqueous acid solution.
* * * * *